(12) United States Patent
Yamamoto et al.

(10) Patent No.: US 9,197,840 B2
(45) Date of Patent: Nov. 24, 2015

(54) HEAD MOUNT DISPLAY AND METHOD FOR CONTROLLING HEAD MOUNT DISPLAY

(71) Applicant: Sony Corporation, Tokyo (JP)

(72) Inventors: Masaaki Yamamoto, Tokyo (JP);
Atsushi Sugama, Kanagawa (JP);
Naomasa Takahashi, Chiba (JP);
Ayataka Nishio, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 331 days.

(21) Appl. No.: 13/654,072

(22) Filed: Oct. 17, 2012

(65) Prior Publication Data
US 2013/0300949 A1   Nov. 14, 2013

(30) Foreign Application Priority Data

Oct. 24, 2011   (JP) ................. 2011-233031

(51) Int. Cl.
*H04N 5/72*   (2006.01)
*H04R 1/10*   (2006.01)
*G02B 27/01*   (2006.01)
*H04N 5/70*   (2006.01)

(52) U.S. Cl.
CPC ............. *H04N 5/70* (2013.01); *G02B 27/017* (2013.01); *H04R 1/1041* (2013.01); *G02B 2027/014* (2013.01); *H04R 2430/01* (2013.01)

(58) Field of Classification Search
CPC ....................................................... H04N 5/70
USPC .................................................... 348/800, 61
See application file for complete search history.

(56) References Cited

U.S. PATENT DOCUMENTS

| | | | |
|---|---|---|---|
| 2008/0025525 A1* | 1/2008 | Tsai ................. | 381/74 |
| 2008/0166002 A1* | 7/2008 | Amsel ............. | 381/370 |
| 2010/0079356 A1* | 4/2010 | Hoellwarth ..... | 345/8 |
| 2010/0259471 A1* | 10/2010 | Takano et al. ... | 345/156 |
| 2011/0012896 A1* | 1/2011 | Ji .................... | 345/419 |
| 2011/0051967 A1* | 3/2011 | Lim et al. ........ | 381/322 |
| 2011/0194029 A1* | 8/2011 | Herrmann et al. | 348/569 |

FOREIGN PATENT DOCUMENTS

JP   11-174991 A   7/1999

* cited by examiner

*Primary Examiner* — Noel Beharry
*Assistant Examiner* — Nicole E King
(74) *Attorney, Agent, or Firm* — Hazuki International, LLC

(57) ABSTRACT

Disclosed is a head mount display including: a display section displaying video pictures for the left and right eyes; an audio output section outputting sound accompanying the video pictures; a user operation section operated by the user to adjust the volume of the sound outputted by the audio output section; a mounting sensor detecting whether or not the user has worn the head mount display; and a control section controlling the operation to adjust the volume requested by the user by operating the user operation section in accordance with a detection result from the mounting sensor.

3 Claims, 10 Drawing Sheets

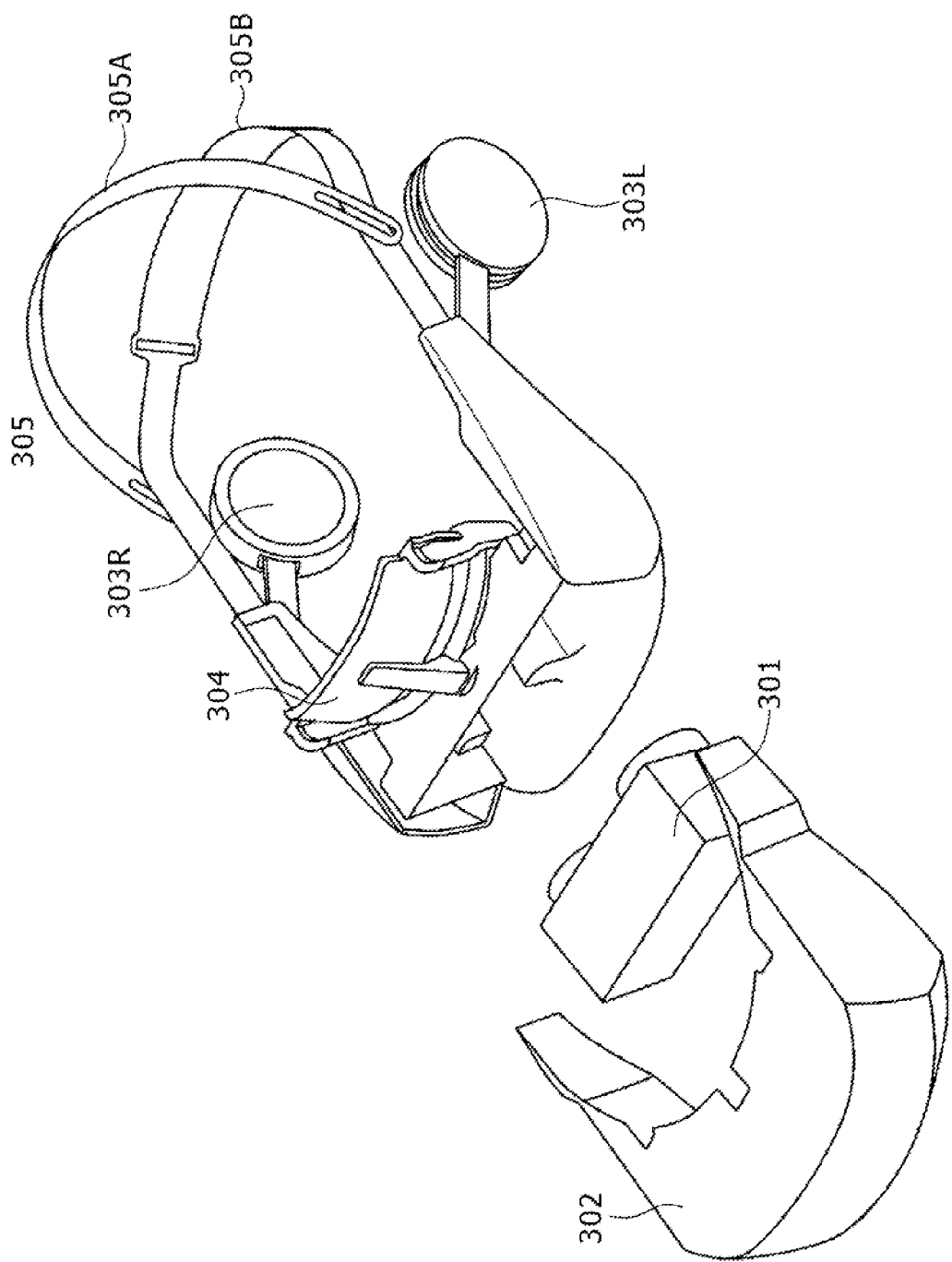

HEAD MOUNT DISPLAY AND METHOD FOR CONTROLLING HEAD MOUNT DISPLAY

CROSS-REFERENCE TO RELATED APPLICATION

The present application claims priority from Japanese Patent Application No. JP 2011-233031 filed in the Japanese Patent Office on Oct. 24, 2011, the entire content of which is incorporated herein by reference.

BACKGROUND

In general, the present technology disclosed in this specification relates to a head mount display which a user mounts or wears on the head to view a video picture, and also relates to a method for controlling the head mount display. More particularly, the present technology relates to a head mount display and a controlling method thereof adapted to prevent occurrence of an incorrect operation when the user is not wearing the head mount display.

A display apparatus mounted or worn on the head of the user to watch a video picture, that is, the so-called HMD (head mount display) is widely known. The head mount display includes an optical unit for each of the left and right eyes, and is configured to control the visual sensation and the auditory sensation of the user in use with headphones. If the head mount display is configured so as to completely shield the user against the external world when the head mount display is mounted on the user's head, the virtual reality can be increased when the user is viewing a video picture reproduced by a BD (Blu-ray Disc) or the like. In addition, the head mount display is also capable of displaying different video pictures to the left and right eyes. Thus, if images with disparity are displayed to the left and right eyes, a 3D image can be presented.

The head mount display has display sections for the left and right eyes. As the display sections, a display panel having a high resolution can be used. Examples of the display panel having a high resolution are panels formed of a liquid-crystal element or an EL (Electro-Luminescence) element. Further, if a proper field angle is set in an optical system and multiple channels are reproduced by the headphones, the realistic sensations like ones experienced in a theatre may probably be reproduced.

Normally, the main body of a head mount display is provided with a UI (user interface) operation section which handles operations carried out by the user. Here, the operations carried out by the user include operations on a reproduction apparatus such as a BD player; for example, reproduction, termination, fast-forwarding, fast-rewinding, volume adjustment of the headphones, and so on. The UI operation section is provided with buttons to be operated by the user in order to carry out those user operations. While the user is watching a video picture reproduced by the BD player with the head mount display, the user carries out controls from reproduction to termination, and the user may also adjust the volume to a proper level through the UI operation section.

Generally, even after the user had taken off the head mount display from his or her head, the audio continues to be output from the headphones at a volume at which the user had set through the UI operation section. This is similar to other AV (Audio-Visual) apparatus that an audio is continuously output from the headphones even while the user is away from the apparatus.

However, while the head mount display is dismounted from the user's head, due to an external factor such as an erroneous operation or application of weight, the "+" button of the volume may be pressed for a long time, that is, pressed in a way that the volume increases. As a result, the volume may reach the maximum level without the user noticing it.

Later on, when the user again wears the head mount display in order to resume viewing, there is a fear that the user hears a detonating sound which may cause an auditory disorder or health damage related to auditory sense.

For example, Japanese Patent Laid-open No. Hei 11-174991 discloses a head mount display configured to prevent an incorrect operation between a select switch and a confirm switch by setting the operation direction of the confirm switch, a switch for confirming various screen settings and volume setting, at 90 degrees from the operation direction of the select switch. Even though this head mount display is designed to prevent the user from carrying out an incorrect operation while the user is watching a video picture, that is, wearing the head mount display, it is not configured to prevent occurrence of an incorrect operation when the user is not watching a video picture, that is, not wearing the head mount display due to an external cause. To be more specific, if a setting operation is carried out at two stages, for example a select operation stage and a confirm operation stage, the head mount display can prevent incorrect operation. However, if a setting operation is carried out at one stage, for example by operating a "+" or "−" button, the head mount display cannot prevent incorrect operation. In addition, it is a complicated operation for the user to carry out setting at two stages of a select operation stage and a confirm operation stage.

SUMMARY

It is thus desirable to provide a head mount display capable of preventing occurrence of an incorrect operation when the user is not wearing the head mount display, and a controlling method therefore.

It is also desirable to provide a head mount display capable of preventing an incorrect operation, such as volume changing without user's control, occurring inadvertently due to an external cause or the like when the user is not wearing the head mount display, and a controlling method therefore.

One embodiment of the present technology is a head mount display including:

a display section displaying video pictures for the left eye and the right eye;

an audio output section outputting sound accompanying the video pictures;

a video signal processing section processing a video signal of the video pictures for the left eye and the right eye;

a user operation section operated by the user to adjust the volume of the sound outputted by the audio output section;

a mounting sensor detecting whether or not the user has worn the head mount display; and a control section controlling the operation to adjust the volume requested by the user by operating the user operation section in accordance with a detection result from the mounting sensor.

According to another embodiment, in the head mount display described above, the control section invalidates all volume changing operations carried out on the user operation section when the mounting sensor has detected a dismounted state in which the user is not wearing the head mount display.

According to another embodiment, in the head mount display, the control section invalidates an operation carried out on the user operation section to increase the volume when the mounting sensor has detected a dismounted state in which the user is not wearing the head mount display.

According to another embodiment, in the head mount display, the control section invalidates a continuous operation carried out on the user operation section to increase or decrease the volume when the mounting sensor has detected a dismounted state in which the user is not wearing the head mount display.

According to another embodiment, in the head mount display, the control section invalidates a continuous operation carried out on the user operation section to increase the volume when the mounting sensor has detected a dismounted state in which the user is not wearing the head mount display.

Another embodiment of the present technology is a method for controlling a head mount display, the method including:

processing a video signal of video pictures for the left eye and the right eye;

outputting sound accompanying the video pictures;

inputting of a request by the user to adjust the volume of the output sound;

detecting whether or not the user has worn the head mount display; and controlling the operation to adjust the volume inputted by the user in accordance with a detection result of the detection.

The embodiments of the present technology disclosed in this specification provide head mount displays capable of suitably preventing occurrence of an incorrect operation when the user is not wearing the head mount display, and a controlling method therefore.

In addition, the embodiments of the present technology disclosed in this specification provide head mount displays capable of suitably preventing an incorrect operation, such as volume changing without user's control, from being carried out inadvertently due to an external cause or the like while the head mount display is taken off, and a controlling method therefore.

The other characteristics and advantages of the embodiments of the present technology disclosed in this specification shall be more understood from the following detailed explanation of the embodiments with reference to accompanying diagrams.

BRIEF DESCRIPTION OF THE DRAWINGS

FIG. 3B is an exploded view of the head mount display;

DETAILED DESCRIPTION OF THE PREFERRED EMBODIMENTS

Next, referring to the diagrams, embodiments of the present technology disclosed in this specification is described in details.

Figure 1:
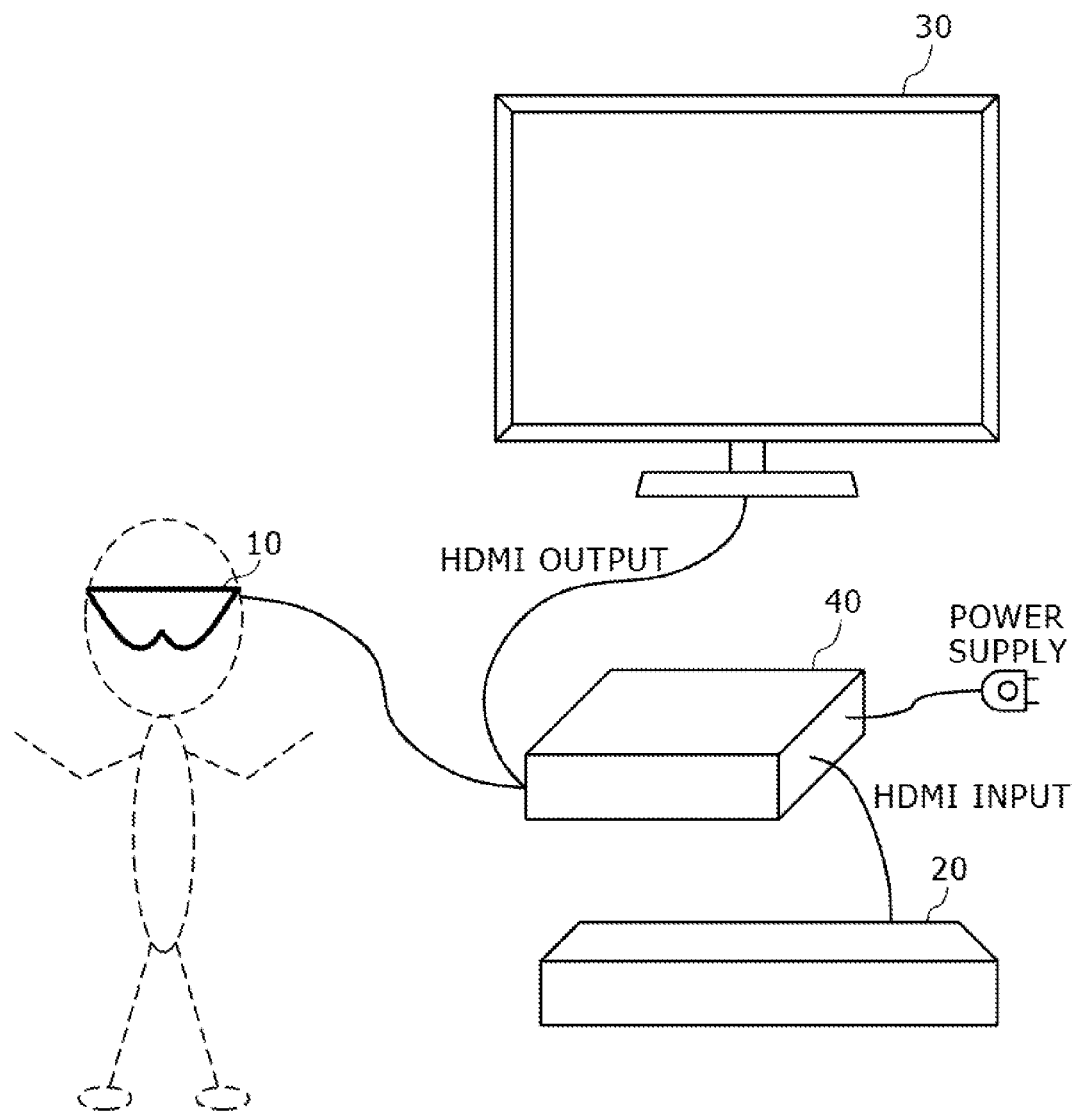
FIG. 1 is a model diagram showing the configuration of an image display system including a head mount display.

FIG. 1 is a model diagram showing the configuration of an image display system including a head mount display 10. As shown in the figure, the image display system is configured to include the body of the head mount display 10, a blu-ray disc reproduction apparatus 20, a high-definition display 30 and a front-end box 40. The blu-ray disc reproduction apparatus 20 is the source of content to be watched and listened to by the user. The high-definition display 30 such as an HDMI (High-Definition Multimedia Interface) compatible television is another output destination of content reproduced by the blu-ray disc reproduction apparatus 20. The front-end box 40 is a section for carrying out processing on an AV (Audio-Video) signal generated by the blu-ray disc reproduction apparatus 20.

The front-end box 40 functions as an HDMI repeater. That is to say, when the front-end box 40 receives an AV signal from the blu-ray disc reproduction apparatus 20 as an HDMI input, the front-end box 40 carries out, for example, processes the AV signal and outputs the processed signal as an HDMI output. In addition, the front-end box 40 also serves as a two-output switcher operative to switch the output destination of the blu-ray disc reproduction apparatus 20 between the head mount display 10 and the high-definition display 30. In the example shown in the figure, the front-end box 40 has two outputs, but the front-end box 40 may also have three or more outputs. The front-end box 40 outputs an AV signal to a destination exclusively, giving priority to the output to the head mount display 10.

It is to be noted that HDMI (High-Definition Multimedia Interface) is an interface standard for digital home electronics for transferring mainly audio and video. HDMI is based on DVI (Digital Visual Interface) and adopts TMDS (Transition Minimized Differential Signaling) on the physical layer. The image display system conforms to HDMI 1.4, for example.

An HDMI cable connects the front-end box 40 with the blu-ray disc reproduction apparatus 20 and another HDMI cable connects the front-end box 40 with the high-definition display 30. It is also possible to adopt a configuration in which the front-end box 40 and the head mount display 10 are also connected by an HDMI cable, but alternatively a cable of a different specification may be used to serially transmit AV signals. The one cable connecting the front-end box 40 and the head mount display 10 is desired to be capable of supplying an AV signal and power, as well as bidirectional communication between the front-end box 40 and the head mount display 10 so that the head mount display 10 can also obtain driving power through this cable.

The head mount display 10 has two independent display sections for the left and right eyes, respectively. Each of the two display sections employs, for example, an organic EL element. In addition, each of the left and right display sections is provided with an optical system having low distortion, high resolution and a wide view angle.

Figure 2:
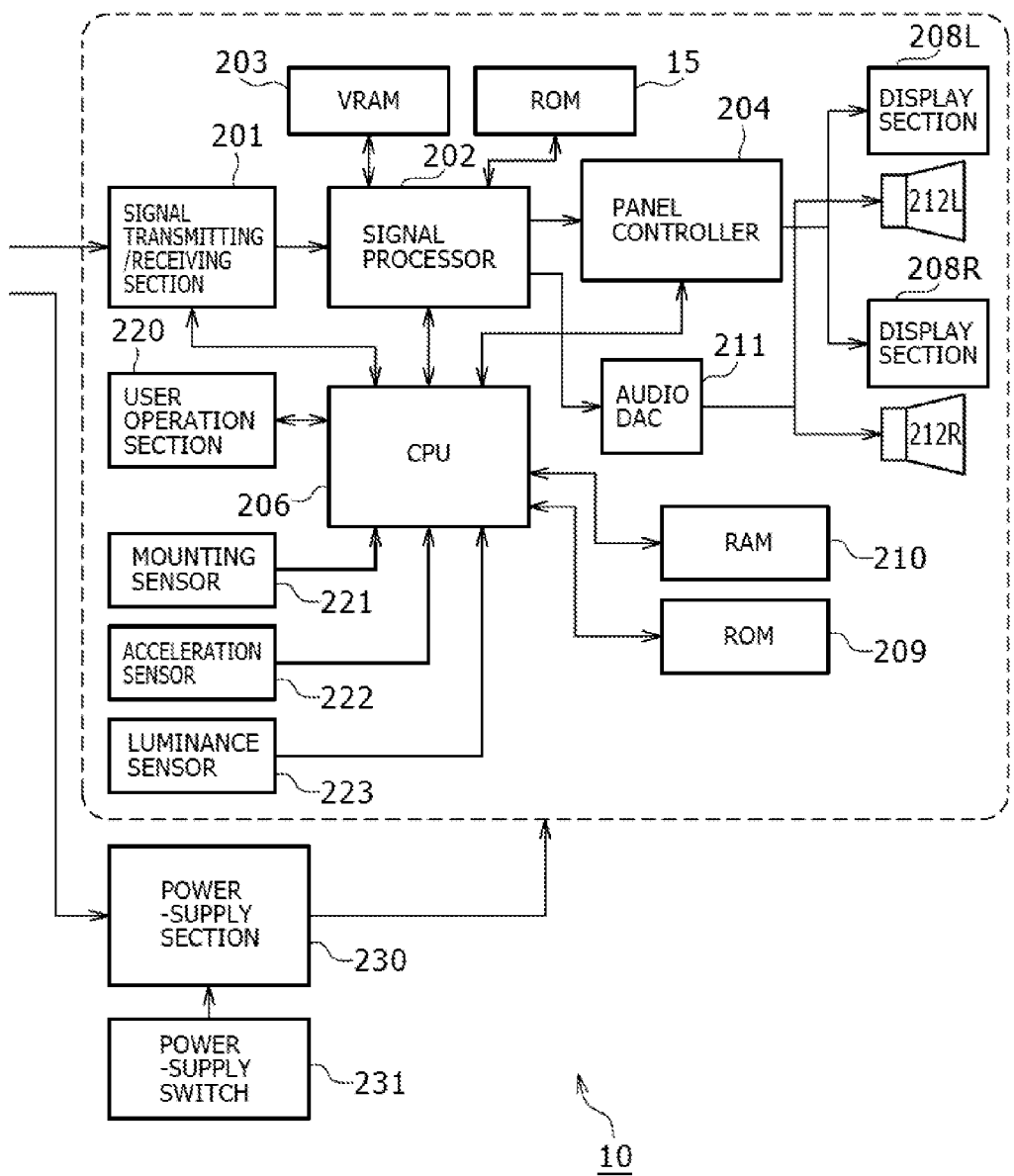
FIG. 2 is a model diagram showing the internal configuration of the head mount display.

FIG. 2 is a model diagram showing the internal configuration of the head mount display 10.

A signal transmitting/receiving section 201 receives an AV signal through a cable connecting the head mount display to the front-end box 40, and transmits an information signal processed by a CPU (Central Processing Unit) 206 to be described later. In this embodiment, the AV signal is transmitted serially through the cable. Thus, the signal transmitting/receiving section 201 carries out serial/parallel conversion to convert the received signal.

A signal processor 202 splits the AV signal received by the signal transmitting/receiving section 201 into a video signal and an audio signal, and then carries out video-signal processing and audio-signal processing on the video signal and the audio signal.

The video-signal processing performed by the signal processor 202 includes luminance-level adjustment, contrast adjustment and image-quality improvement. In addition, in accordance with commands received from the CPU 206, the signal processor 202 also carries out various kinds of processing on the original video signal. For example, the signal processor 202 generates OSD (On Screen Display) information composed of characters and figures, and superimposes it on the original video signal. Signal patterns necessary for generating the OSD information are stored in a ROM (Read-Only Memory) 15, and in the process of OSD information generation, the signal processor 202 reads out a signal pattern therefrom. One example of the OSD information superposed on the original video signal is a GUI (Graphical User Interface) used typically to adjust the screen and audio output. The screen information obtained through the video-signal processing is temporarily stored in a VRAM 203 serving as a frame memory. If the AV signal received from the front-end box 40 contains different video signals for the left and right eyes as is the case with, for example, a 3D video signal, the signal processor 202 separates the left-eye and right-eye video signals to generate the screen information.

A left-eye display section 208L and a right-eye display section 208R each includes a display panel made of organic EL elements, and a gate driver and a data driver driving the display panel. In addition, each of the left-eye display section 208L and the right-eye display section 208R is provided with an optical system having a large visual-field angle. However, the optical systems are not shown in FIG. 2.

A panel controller 204 reads out screen information from the VRAM 203 at every display period which is determined in advance. The panel controller 204 converts the screen information into signals to be supplied to the left-eye display section 208L and the right-eye display section 208R, and also generates pulse signals such as a horizontal synchronization signal and a vertical synchronization signal which are to be used for the operations of the gate and data drivers.

The CPU (Central Processing Unit) 206 executes a program loaded from a ROM 209 into a RAM (Random-Access Memory) 210 in order to control the entire operation of the head mount display 10 in an integrated manner. In addition, the CPU 206 controls exchange of information signals with the front-end box 40 by way of the signal transmitting/receiving section 201.

The main body of the head mount display 10 is provided with a user operation section 220 having one or more operational elements which the user may operate with a finger or by other means. Although not shown in the figures, the operational elements may be a combination of upward, downward, left and right cursor keys with a confirmation key on the center. In addition, in this embodiment, the user operation section 220 is also provided with a "+" button and a "−" button for increasing and decreasing the volume of left and right headphones 212L and 212R. In accordance with a command entered by the user through the user operation section 220, the CPU 206 requests the signal processor 202 to carry out processing on video outputs to be output from the left-eye and right-eye display sections 208L and 208R, as well as audio outputs to be output from the left and right headphones 212L and 212R. In addition, when the user makes a request related to content reproduction from the user operation section 220, such as reproduction, termination, fast-forwarding, or fast-rewinding of a video, the CPU 206 transmits an information signal to the front-end box 40 by way of the signal transmitting/receiving section 201 in order to inform the front-end box 40 of the request.

In addition, in this embodiment, the head mount display 10 is provided with a variety of sensors such as a mounting sensor 221, an acceleration sensor 222 and a luminance sensor 223. Outputs of these sensors are sent to the CPU 206.

As will be described later, the mounting sensor 221 is for example constituted by components including a mechanical switch. In accordance with a signal received from the mounting sensor 221, the CPU 206 determines whether or not the head mount display 10 is being mounted on the head of the user, that is, whether the head mount display 10 is being used at the present time.

The acceleration sensor 222 is for example a triaxial accelerometer detecting the magnitude and direction of the acceleration of the head mount display 10. Based on the obtained acceleration information, the CPU 206 can track the movement of the head of the user wearing the head mount display 10.

The luminance sensor 223 detects the luminance of the environment in which the head mount display 10 is placed at the present time. Based on the luminance information received from the luminance sensor 223, the CPU 206 may control adjustment of the luminance level applied to the video signal.

In addition, if necessary, the CPU 206 may transmit the information received from the sensors 221 to 223 to the front-end box 40 by way of the signal transmitting/receiving section sensor 201.

A power-supply section 230 distributes driving power received from the front-end box 40 to the circuit components enclosed by a dashed line in FIG. 2. In addition, the main body of the head mount display 10 is provided with a power-supply switch 231 which can be operated by the user with a finger or by other means. By operating the power-supply switch 231, the user can switch ON/OFF of power supply to the circuit components from the power-supply section 230.

Incidentally, when the power-supply switch 231 is OFF, the head mount display 10 is in a standby state in which the power-supply section 230 stands by in a state to supply power. On the other hand, according to a change in the level of voltage on a signal line connecting the front-end box 40 and the power-supply section 230, the front-end box 40 can determine whether or not the circuit components are being supplied with power and operating, that is whether or not the head mount display 10 is being used at the present time.

Figure 3A:
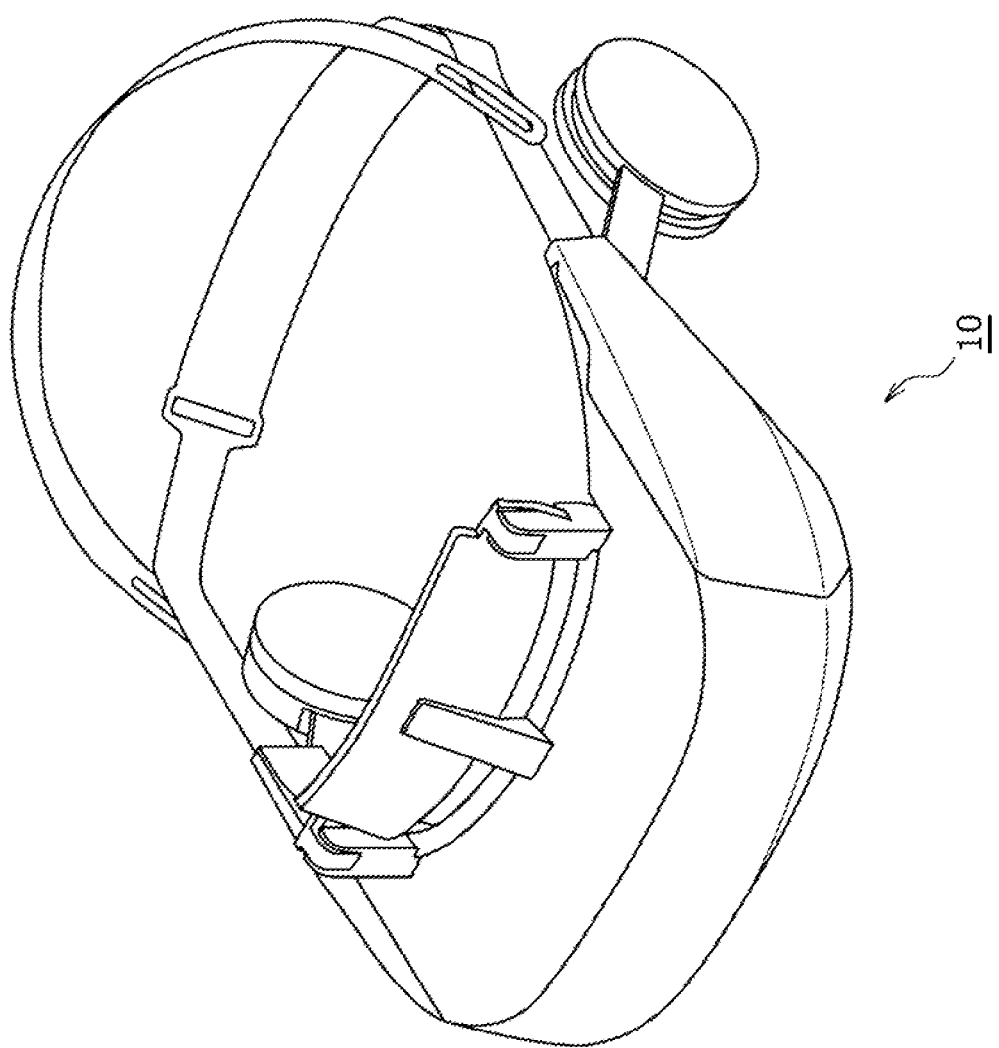
FIG. 3A is a perspective view of the head mount display as seen from a left front direction.

FIGS. 3A and 3B are diagrams showing a configuration example of the external view of the head mount display 10. FIG. 3A is a perspective view of the head mount display 10 as seen from a left front direction, whereas FIG. 3B is an exploded view of the head mount display 10 in which the device is disassembled to some extent. Referring to FIG. 3B, the head mount display 10 includes a display unit section 301, an external case 302, a forehead pad section 304, head bands 305, a left headphone section 303L and a right headphone section 303R. The display unit section 301 includes many of the main components shown in FIG. 2 including the display system. The external case 302 is a case covering the display unit section 301. The forehead pad section 304 is a section protruding from the upper surface of the external case 302. The head bands 305 are an upper head band 305A and a lower head band 305B. The left headphone section 303L and the right headphone section 303R accommodate a left headphone 212L and a right headphone 212R, respectively. The display unit section 301 accommodates the left and right display sections 208L, 208R and a circuit board.

When the user wears the head mount display 10, the forehead pad section 304 is brought into contact with the forehead of the user, whereas the head bands 305 contact with the back of the head. Although a detailed illustration is omitted in FIGS. 3A and 3B, the head bands 305 are designed such that their lengths can be adjusted and are made of a stretchable material, so that the head bands 305 are bound around the head to fix the head mount display 10 on the head.

In addition, although not shown in FIGS. 3A and 3B, as explained above, the user operation section 220 includes the "+" button and "−" button operated to increase and decrease the volume of the headphones 212L and 212R. The "+" and "−" buttons are provided, for example, on the bottom portion of the body of the head mount display 10.

Figure 4:
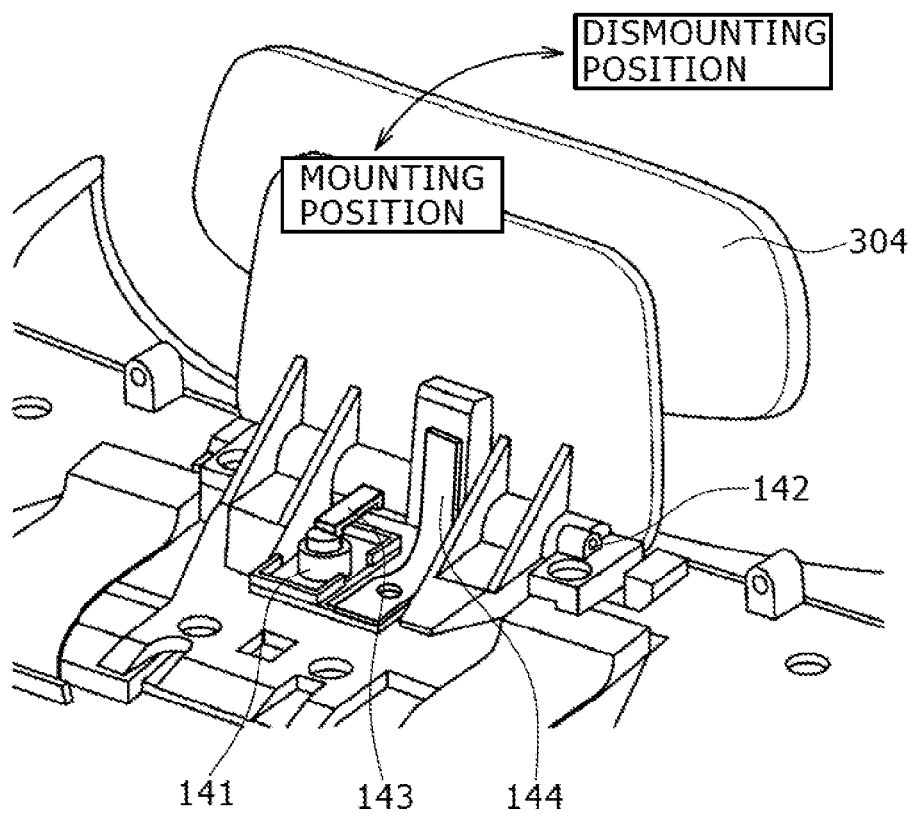
FIG. 4 is a diagram showing an example of the configuration of a mounting sensor.

FIG. 4 is a diagram showing an example of the configuration of the mounting sensor 221. In the example illustrated in this figure, the forehead pad section 304 is supported by a rotation shaft 142 on the external case of the head mount display 10 in such a way that the forehead pad section 304 can be rotated. When the head mount display 10 is not being worn, the forehead pad section 304 is pushed by the restoring force of a spring 144 in a direction toward the rear of the head mount display 10, to a dismounting position which is on the side where the forehead of the user who wears the head mount display 10 will be set. On the other hand, when the head mount display 10 is being worn, the forehead of the user is brought into contact with the forehead pad section 304 so that the forehead pad section 304 is pushed back to a mounting position on the front side. In addition, an arm 143 protruding frontward is attached to the rotation shaft 142. When the user wears the head mount display 10 and the forehead pad section 304 is pushed back frontward, the arm 143 moves in conjunction so that the edge thereof operates a tact switch 141 which corresponds to the mounting sensor 221. According to the operation on the tact switch 141, the CPU 206 can detect that the head mount display 10 has been mounted on the head of the user.

Figure 5:
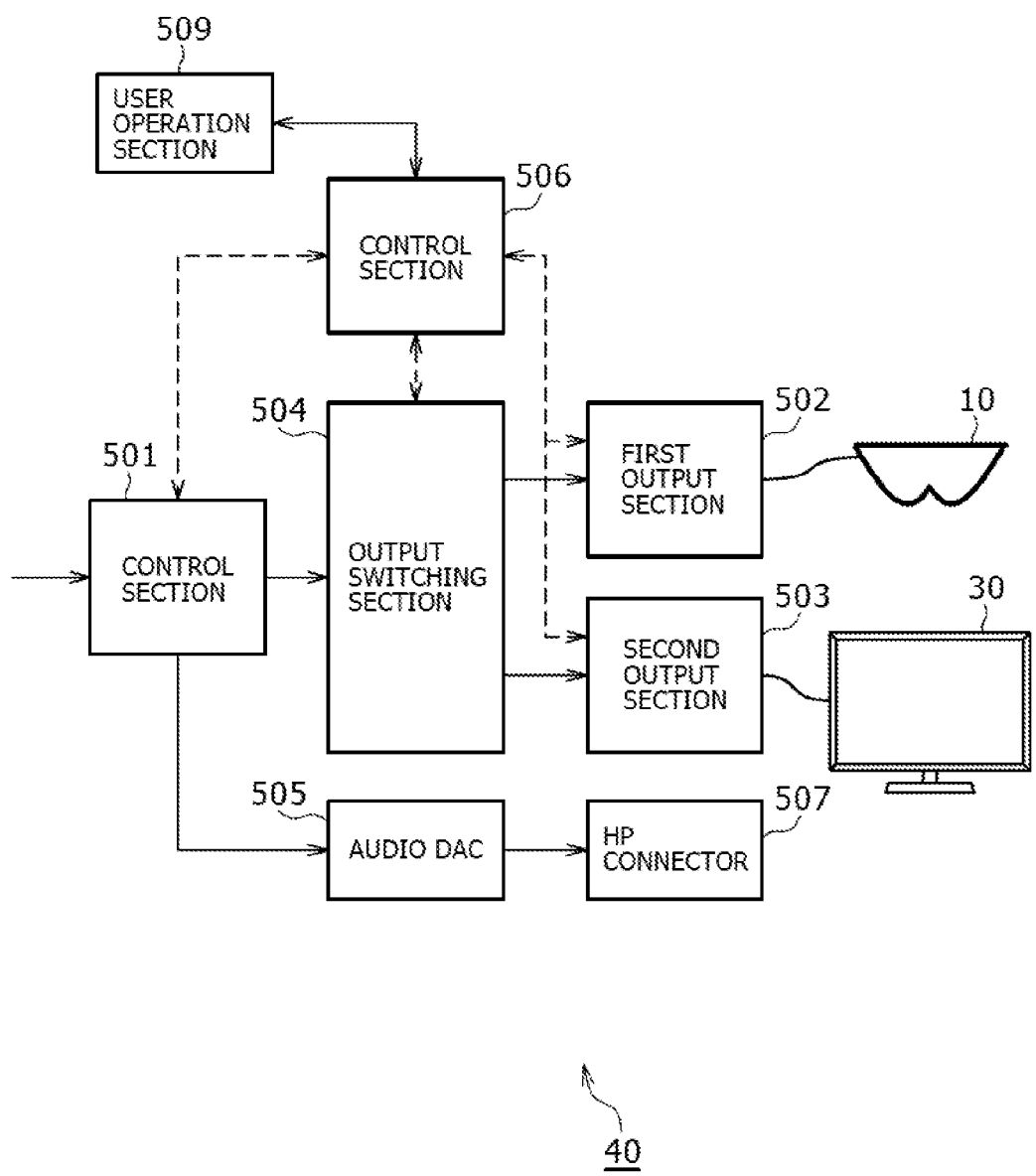
FIG. 5 is a model diagram showing an example of the internal configuration of a front-end box.

FIG. 5 is a model diagram showing an example of the internal configuration of the front-end box 40.

An HDMI input section 501 is HDMI compliant. The HDMI input section 501 is connected to the blu-ray disc reproduction apparatus 20 by an HDMI cable, and carries out signal processing such as equalization on an AV signal output from the blu-ray disc reproduction apparatus 20.

A first output section 502 is connected to the head mount display 10, whereas a second output section 503 is connected to the high-vision display 30.

The second output section 503 is HDMI compliant, and outputs an AV signal to the high-vision display 30 connected via an HDMI cable. It is to be noted that the front-end box 40 may also be configured to employ a plurality of second output sections 503 for outputting AV signals to two or more HDMI compliant TVs.

On the other hand, the first output section 502 in this embodiment complies with an original interface standard. It is needless to say that the first output section 502 can also be configured to be HDMI compliant. The first output section 502 is connected to the head mount display 10 via a cable compliant to the original interface standard. Through this cable, AV signals, driving power, and various information signals are delivered between the head mount display 10 and the front-end box 40.

A control section 506 controls the operations of the components in the front-end box 40 in an integrated manner.

An output switching section 504 determines the output destination of an AV signal received from the HDMI input section 501 by selecting one of the first output section 502 and the second output section 503. That is to say, the output switching section 504 selectively switches the output destination of the AV signal between the head mount display 10 and the high-vision display 30. In this embodiment, the output switching section 504 sets the output destination of the AV signal exclusively, placing highest priority on the output to the head mount display 10.

The body of the front-end box 40 is provided with a user operation section 509 having one or more operational elements which can be operated by the user with a finger or by other means. The user can also change the destination of an AV signal via the user operation section 509.

An audio DAC 505 converts an audio signal separated in the HDMI input section 501 into an analog signal and outputs the analog signal from an HP (headphone) connector 507.

In this case, as explained above, the volume of the left and right headphones 212L and 212R is adjusted by operating the "+" and "−" buttons included in the user operation section 220. The volume increases or decreases by a number of steps according to the number of times the button had been operated. As a matter of course, it may be configured such that the volume continuously increases or decreases by a plurality of steps when the "+" or "−" button is pressed for a long time, that is, operated continuously. Generally, it is possible to output sound from the headphones 303L and 303R at a volume set by operating the user operation section 220 even when the head mount display 10 is not being worn.

However, while the head mount display 10 is taken off from the head, the volume button may be inadvertently pressed continuously for a long period of time in the direction of "+", i.e., in a direction that the volume increases due to an external factor such as an incorrect operation or application of weight. This results in the volume to increase to the maximum level without the user being aware of it. If the head mount display 10 is a type that has the "+" and "−" volume buttons on the bottom of the body thereof, for example by merely placing the head mount display on a table, there is a possibility that the "+" volume button is inadvertently pressed, may be even for a long period of time.

Later on, when the user again wears the head mount display 10 in order to resume viewing, there is a fear that the user hears a detonating sound which may cause a hearing disorder or a health injury related to auditory sense. It is disadvantageous for the user not only when the "+" volume is arbitrarily operated while the head mount display is dismounted but also when the same thing happens to the "−" volume button, because the volume changes without the user noticing it. In a sound deadening state, however, there is no risk of damaging the auditory sense. In the case of a detonating sound, on the other hand, there is a risk of causing an auditory disorder. Thus, an incorrect operation on the "+" volume button occurring while the head mount display 10 is dismounted is particularly a problem.

Regarding this problem, in this embodiment, the head mount display 10 is configured to control volume adjustment operated by the user when the head mount display 10 is a in a dismounted state, a state in which the head mount display 10 is not worn. Examples of methods that can be adopted for the controlling of volume adjustment (or changing) in the dismounted state are described below.

(1) All volume changing operations are invalidated in the dismounted state.

(2) An operation carried out on the volume button in the "+" direction, that is, in the direction to increase the volume is invalidated in the dismounted state.

(3) Operations to press the volume button in the "+" direction and the volume button in the "−" direction for a long period of time are invalidated in the dismounted state.

(4) An operation to press the volume button in the "+" direction for a long period of time is invalidated in the dismounted state.

As shown in FIGS. 2 and 4, in this embodiment, the head mount display 10 is equipped with the mounting sensor 221. Therefore, based on the mounting state detected by the mounting sensor 221, i.e., whether the head mount display 10 is being worn or not, the CPU 206 can request the signal processor 202 to carry out volume adjustment control to control a volume changing operation carried out through the user operation section 220.

According to the volume adjustment control methods (1) and (3) described above, when the head mount display is in a dismounted state, an operation carried out on either volume button is invalidated so that it is possible to prevent the volume from changing without the user being aware of it, or an operation to continuously press either volume button for a long period of time is invalidated so that it is possible to prevent the volume from changing largely. Thus, even if the volume button is inadvertently operated due to an external cause, the volume does not change at all or change largely. When the user again wears the head mount display 10 and the head mount display 10 returns to the mounted state, the user can view the video with the sound set at a volume level similar to the level at which it had been set. Thus, the user will not feel a sense of strangeness when resuming viewing.

On the other hand, according to the volume adjustment control methods (2) and (4), when the head mount display 10 is in a dismounted state, an operation carried out on the volume button in the "+" direction is invalidated so as to prevent the volume from increasing, or an operation to press the volume button continuously in the "+" direction for a long period of time is invalidated so as to prevent the volume from increasing largely. Thus, even if the volume button is inadvertently operated due to an external cause, the volume does not increase at all or increase largely. When the user again wears the head mount display 10 and the head mount display 10 returns to the mounted state, the volume will not be greater than that it had been set at. As a result, there is no risk that the user hears a detonating sound which may cause an auditory sense disorder or health damage related to auditory sense.

Figure 6:
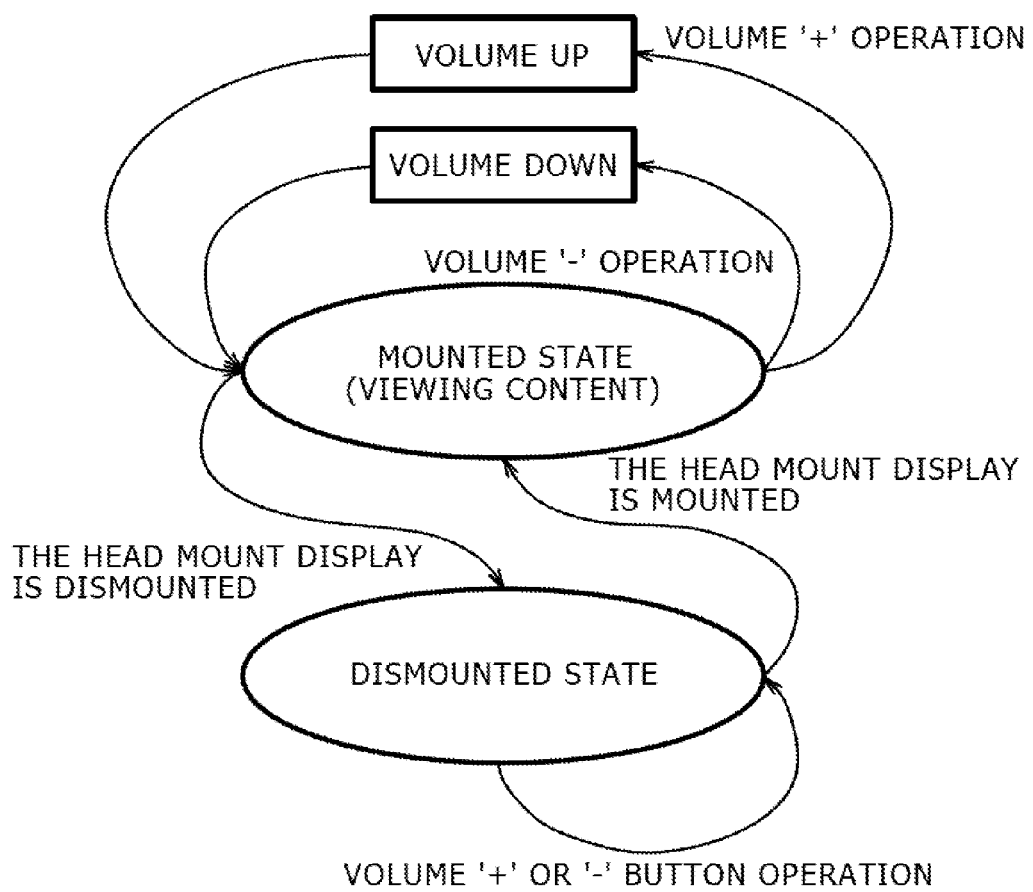
FIG. 6 shows the operation flow of a case where all volume changing operations are invalidated when the head mount display is in a dismounted state.

FIG. 6 shows the operation flow of the case where all volume changing operations are invalidated when the head mount display 10 is in a dismounted state.

When the user is watching content with the head mount display 10 in a mounted state in which it is being worn, operations carried out on either of the "+" and "−" direction volume buttons are valid. At this time, if the user pushes the "+" or "−" direction volume button once, or pushes it for a long time, the volume increases or decreases in accordance with the operation. On the other hand, when the head mount display 10 is in a dismounted state in which it is taken off, an operation carried out on the volume button in the "+" and "−" directions is invalidated. Thus, at this time, the volume will not change either when the volume button is pushed once or pushed for a long period of time.

Figure 7:
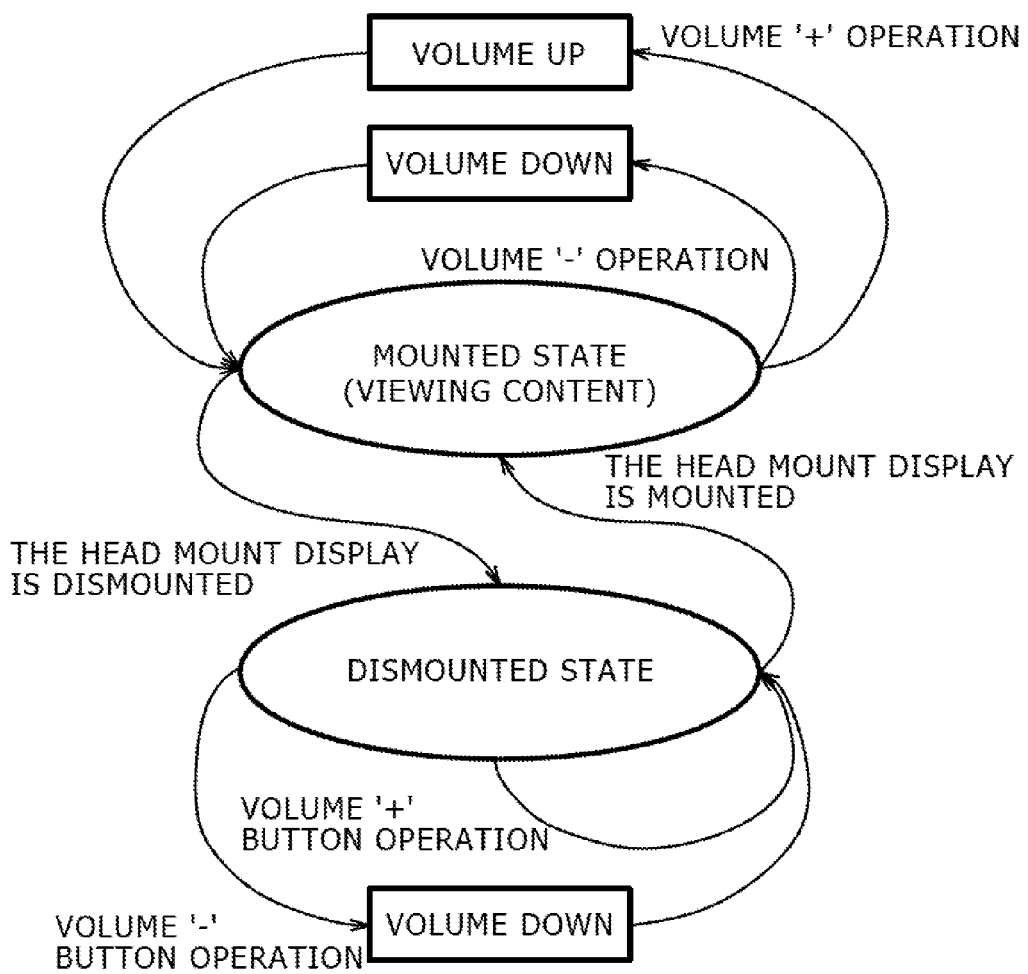
FIG. 7 shows the operation flow of a case where an operation to increase volume is invalidated when the head mount display is in the dismounted state.

Next, FIG. 7 shows the operation flow of the case where an operation carried out in the "+" direction, that is, in a direction to increase the volume is invalidated when the head mount display 10 is in the dismounted state. In this case, an operation carried out in the "−" direction, that is, in a direction to decrease the volume is valid even when the head mount display 10 is in the dismounted state.

While the user is watching content with the head mount display 10 in the mounted state in which it is being worn, operations carried out on either of the "+" and "−" direction volume buttons are valid. At this time, if the user pushes the "+" or "−" direction volume button once, or pushes it continuously for a long period of time, the volume increases or decreases in accordance with the operation. On the other hand, when the head mount display 10 is in the dismounted state in which it is taken off, an operation carried out on the "+" direction, that is, in a direction to increase the volume is invalidated. Thus, at this time, the volume will not increase either when the user pushes the button once or pushes it continuously for a long period of time. However, an operation carried out in the "−" direction, in a direction to decrease the volume stays valid in the dismounted state as well. Thus, if the user pushes the "−" direction volume button once or pushes it continuously for a long period of time, the volume decreases in accordance with the operation.

Figure 8:
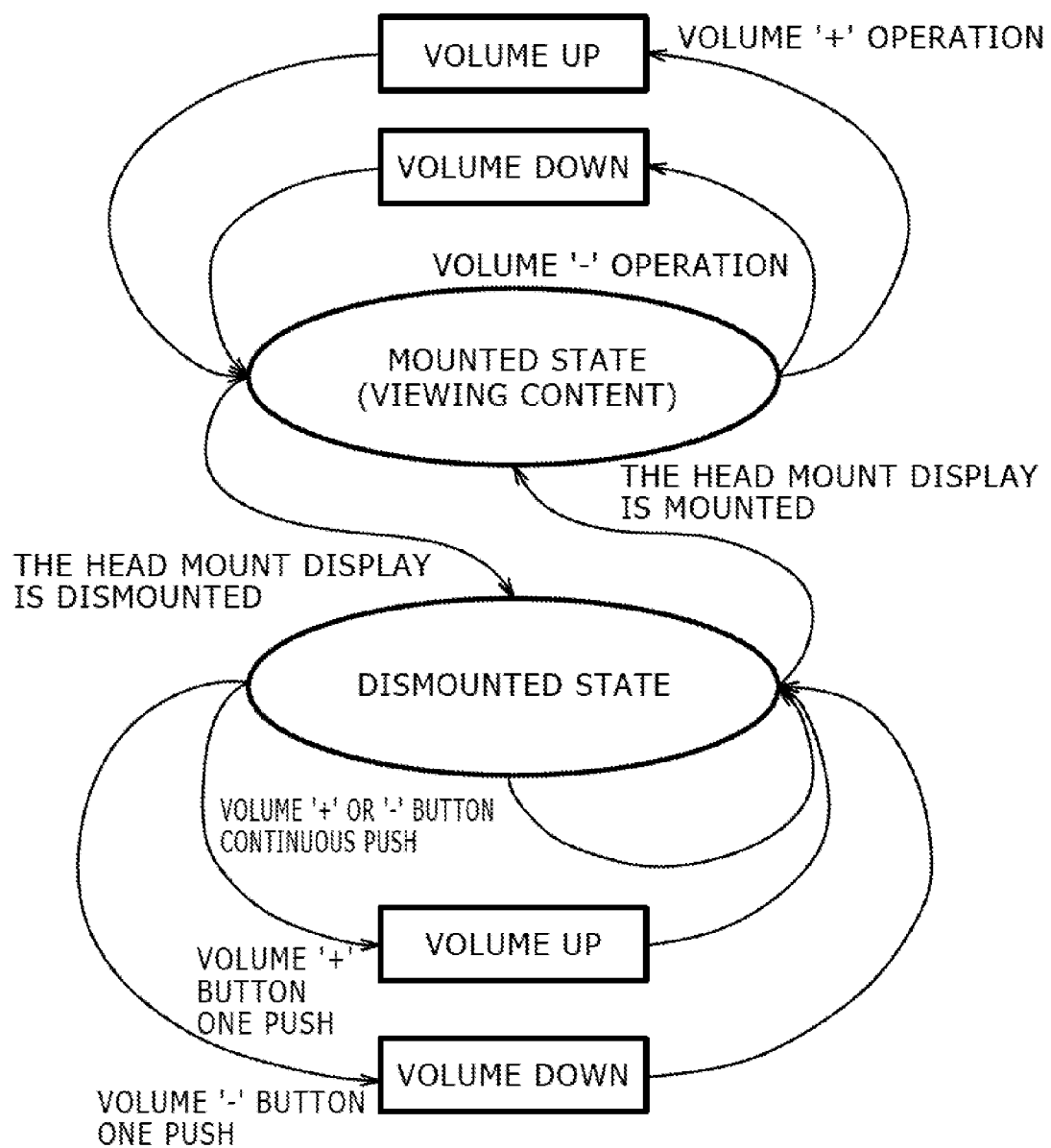
FIG. 8 shows the operation flow of a case where an operation to continuously press either of a "+" direction volume button and a "−" direction volume button for a long period of time is invalidated when the head mount display is in the dismounted state.

FIG. 8 shows the operation flow of the case in which an operation to continuously push the "+" direction button or the "−" direction button for a long period of time is invalidated when the head mount display 10 is in the dismounted state. In this case, even while the head mount display 10 is in the dismounted state, an operation carried out on the "+" direction volume button or the "−" direction volume button is valid if the operation is a one-push operation.

When the user is watching content with the head mount display 10 in the mounted state in which it is being worn, an operation carried out on either of the "+" and "−" direction volume buttons is valid. At this time, if the user pushes the "+" or "−" direction volume button once or pushes it continuously for a long period of time, the volume increases or decreases in accordance with the operation. On the other hand, when the head mount display 10 is in the dismounted state in which it is taken off, an operation to continuously push the volume button in either of the "+" and "−" directions for a long period of time is invalidated. Thus, at this time, even if the buttons are pushed for a long period of time, the volume will not change. Meanwhile, an operation to push the button once in the "+" or "−" direction stays valid even when the head mount display 10 is in the dismounted state. Thus, if the volume button of the "+" or "−" direction is pushed once by once, the volume increases or decreases in accordance with the number of times the button had been pushed.

Figure 9:
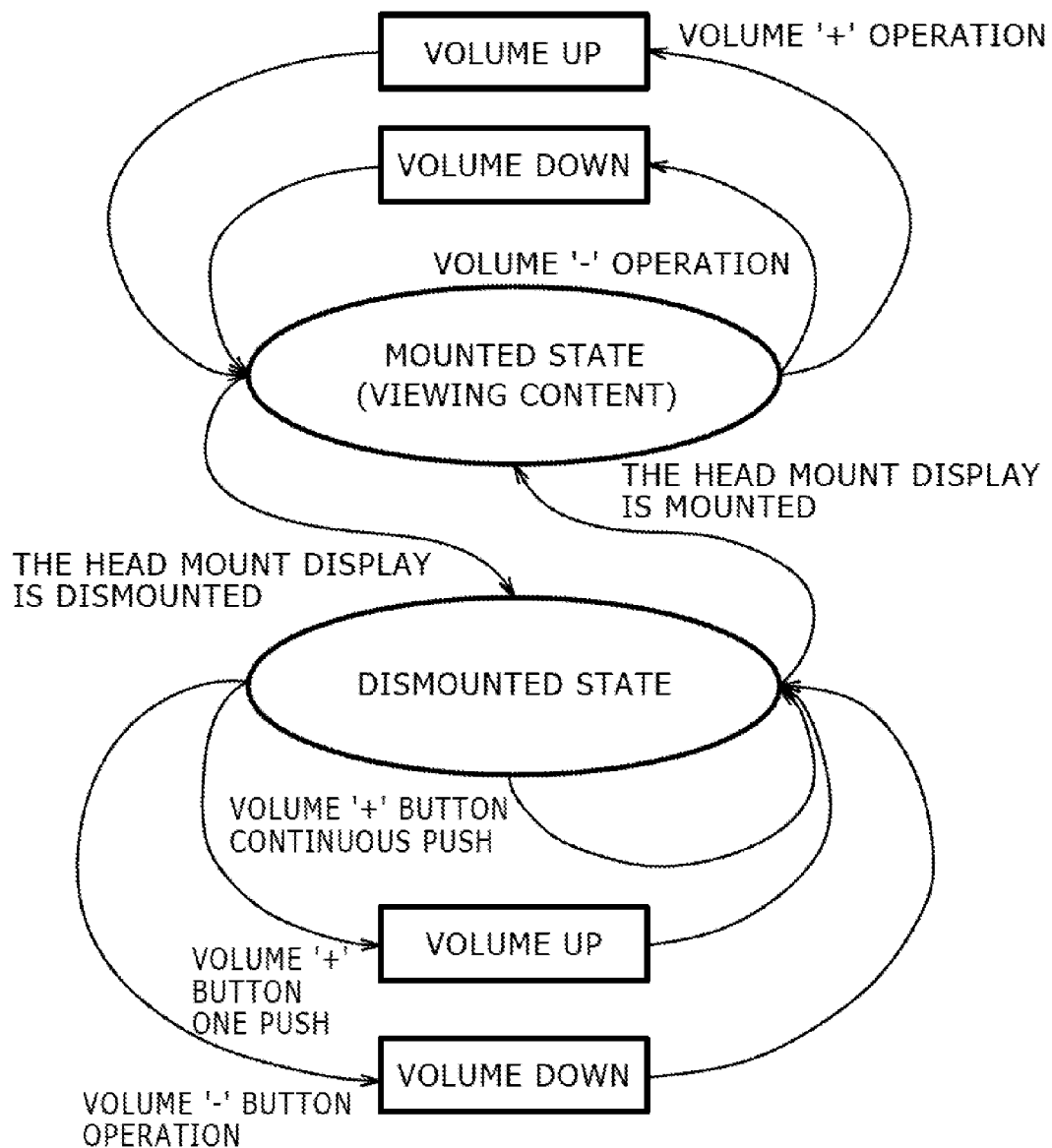
FIG. 9 shows the operation flow of a case where an operation to continuously press the "+" direction volume button for a long period of time is invalidated when the head mount display is in the dismounted state.

FIG. 9 shows the operation flow of the case where an operation to continuously push the "+" direction volume button for a long period of time is invalidated when the head mount display 10 is in the dismounted state. In this case, an operation of pushing the "−" direction volume button once as well as pushing it for a long period of time is always valid. Meanwhile, even when the head mount display is in the dismounted state, an operation carried out on the "+" direction volume button is valid if the operation is a one-push operation. As mentioned, an operation to push the "+" button for a long period of time is invalid. Therefore, the volume will not change even when the "+" direction button is pushed for a long time. Since an operation to push the "+" direction button once remains valid in the dismounted state as well, if the "+" direction button is pushed once by once, the volume increases in accordance with the number of times the volume button had been pushed.

When the user is watching content with the head mount display 10 in the mounted state and being worn, operations carried out on the "+" and "−" direction volume buttons are valid. At this time, if the user pushes the "+" or "−" direction volume button once or for a long period time, the volume increases or decreases in accordance with the operation. On the other hand, when the head mount display 10 is in the dismounted state in which it is taken off, an operation carried out on the "−" direction volume button, that is, in a direction to decrease the volume, stays valid. Thus, when the "−" direction volume button is pushed once or pushed continuously for a long period of time, the volume decrease in accordance with the operation.

Embodiments of the technology disclosed in this specification may also take the following configurations.

(1) A head mount display including:
a display section displaying video pictures for the left eye and the right eye;
an audio output section outputting sound accompanying the video pictures;
a video signal processing section processing a video signal of the video pictures for the left eye and the right eye;
a user operation section operated by the user to adjust the volume of the sound outputted by the audio output section;
a mounting sensor detecting whether or not the user has worn the head mount display; and
a control section controlling the operation to adjust the volume requested by the user by operating the user operation section in accordance with a detection result from the mounting sensor.

(2) The head mount display according to (1), wherein the control section invalidates all volume changing operations carried out on the user operation section when the mounting sensor has detected a dismounted state in which the user is not wearing the head mount display.

(3) The head mount display according to (1), wherein the control section invalidates an operation carried out on the user operation section to increase the volume when the mounting sensor has detected a dismounted state in which the user is not wearing the head mount display.

(4) The head mount display according to (1), wherein the control section invalidates a continuous operation carried out on the user operation section to increase or decrease the volume when the mounting sensor has detected a dismounted state in which the user is not wearing the head mount display.

(5) The head mount display according to (1), wherein the control section invalidates a continuous operation carried out on the user operation section to increase the volume when the mounting sensor has detected a dismounted state in which the user is not wearing the head mount display.

(6) A method for controlling a head mount display, the method including:
processing a video signal of video pictures for the left eye and the right eye;
outputting sound accompanying the video pictures;
inputting of a request by the user to adjust the volume of the output sound;
detecting whether or not the user has worn the head mount display; and
controlling the operation to adjust the volume inputted by the user in accordance with a detection result of the detection.

The present technology disclosed in this specification has been described in details so far with reference to preferred embodiments. However, it is obvious that a person skilled in the art can make various modifications, combinations, sub-combinations and alterations to the embodiments as long as they are within the spirit and scope of the technology disclosed in this specification.

Other than head mount displays, the technology disclosed in this specification can be applied to various types of display apparatus that are used by the user wearing it on the user's head. An example of such apparatus is 3D spectacles employed in a time-division 3D video-picture display system.

In a word, the present technology disclosed in this specification has been described using examples, and the contents of this specification are not to be interpreted limitedly. In order to determine the spirit of the technology disclosed in this specification, the appended claims should be referred to.

What is claimed is:

1. A head mount display comprising:
a display section configured to display video pictures for a left eye and a right eye;
an audio output section configured to output sound accompanying said video pictures;
a user operation section configured to perform a plurality of operations that adjust a volume of said sound outputted by said audio output section;
a mounting sensor configured to detect whether or not a user is wearing said head mount display; and
a control section configured to control said plurality of operations to adjust said volume by operating said user operation section in accordance with a detection result from said mounting sensor,
said control section being configured to invalidate an operation of said plurality of operations, while another operation of said plurality of operations is validated to adjust said volume in an event said mounting sensor has detected a dismounted state in which said user is not wearing said head mount display.

2. The head mount display according to claim 1, wherein said control section invalidates an operation carried out on said user operation section to decrease said volume while power is being supplied to said control section and in the event said mounting sensor has detected said dismounted state in which said user is not wearing said head mount display.

3. A method for controlling a head mount display, said method comprising:
processing a video signal of video pictures for a left eye and a right eye;
outputting sound accompanying said video pictures;
inputting of a request to perform a plurality of operations that adjust a volume of said output sound;
detecting whether or not a user is wearing said head mount display; and
controlling said plurality of operations to adjust said volume inputted by said request in accordance with a detection result of said detection,
said controlling including invalidating an operation of said plurality of operations, while another operation of said plurality of operations is validated to adjust said volume in an event said detecting has determined that said user is not wearing said head mount display.

* * * * *